Aug. 24, 1965 R. L. CARLETON 3,201,841
SIGNBOARD ENGAGING MEANS
Filed May 13, 1963 2 Sheets-Sheet 1

INVENTOR.
Richard L. Carleton
BY
Scofield, Kokjer, Scofield & Lowe
ATTORNEYS.

Aug. 24, 1965    R. L. CARLETON    3,201,841
SIGNBOARD ENGAGING MEANS
Filed May 13, 1963    2 Sheets-Sheet 2
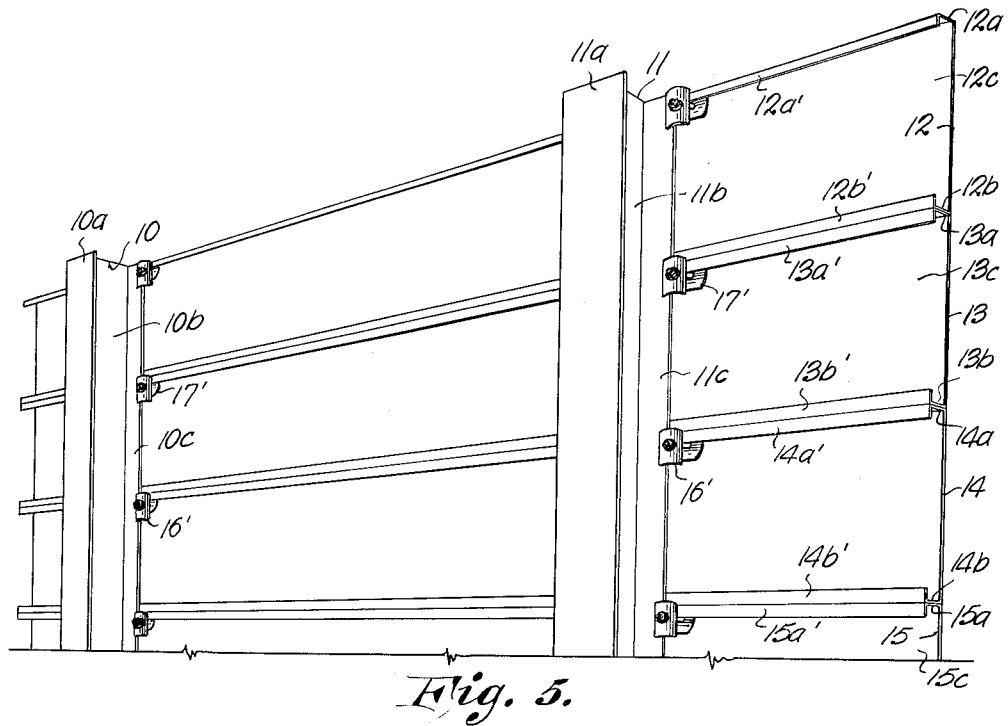
INVENTOR.
Richard L. Carleton
BY
Scofield, Kokjer, Scofield & Lowe
ATTORNEYS.

3,201,841
SIGNBOARD ENGAGING MEANS
Richard L. Carleton, Raytown, Mo., assignor to Butler Manufacturing Company, Kansas City, Mo., a corporation of Missouri
Filed May 13, 1963, Ser. No. 279,772
6 Claims. (Cl. 24—243)

This invention relates to signboard attachment means and refers more particularly to means for attaching elongate horizontally oriented panels to the flanges of vertically oriented supports or posts such as I-beams or other flanged members.

Previously, a number of signboard constructions have been developed which utilize elongate panels oriented in a horizontal direction, the panels supported by vertical flanged posts, one set of flanges thereof to which the panels are attached by various means. However, the said attaching means and their modes of engagement have had numerous drawbacks, including insufficient strength, inability to return from deformation due to wind load forces, difficulty in application, as well as excessive time consumption in same, excessive expense, requirement of structural engagement with the panels themselves which is complicating in many ways, an excessive number of attaching means required per panel and I-beam, and the like.

Accordingly, an object of the invention is to provide new types of attachment means for signboard panels for engagement of same with the flanges of supporting posts.

Another object of the invention is to provide simple, easily and quickly applied attachments for horizontally oriented panels in attachment of same to flanged posts, wherein a minimum number of men and minimum level of skill is required in attachment.

Another object of the invention is to provide an easily produced, extremely cheap, very rugged and long lived attachment for horizontal panels to vertical support flanges.

Another object of the invention is to provide signboard attachments for connecting horizontal, flanged panels to flanged posts wherein the connection is extraordinarily rugged, withstands with ease wind loads far beyond those handled by previous designs and wherein the attachment means themselves are sufficiently resilient to return from any deformation thereof under extraordinary wind loads.

Another object of the invention is to provide connecting means for signboard panels to flanged posts wherein no actual structural connection with either the post or the panel is employed whereby to minimize attachment and detachment effort and time.

Another object of the invention is to provide panel attachment means for attaching panels to flanged posts wherein single panels in a panel array attached by same may be removed without removing the rest of the panels or their attachment means.

Another object of the invention is to provide a signboard construction including elongate horizontal flanged panels, flanged supports or posts and unique means for connecting same, the entire assembly being very much cheaper than the cost of like aluminum extruded signs.

Other and further objects of the invention will appear in the course of the following description thereof.

In the drawings, which form a part of the instant specification and are to be read in conjunction therewith, embodiments of the invention are shown and, in the various views, like numerals are employed to indicate like parts.

FIG. 5 is a three-quarter perspective view from behind and slightly below of a signboard assembly comprising horizontally oriented panels clipped to the front flange of vertically flanged posts by a second form of connecting means to that shown in FIGS. 1–4, inclusive.

FIG. 6 is a view of the FIG. 5 structure like that of FIG. 2, namely, a horizontal section looking down with parts cut away for clarification.

FIG. 7 is an exploded perspective view of the connecting means of FIGS. 5 and 6.

Figure 1:
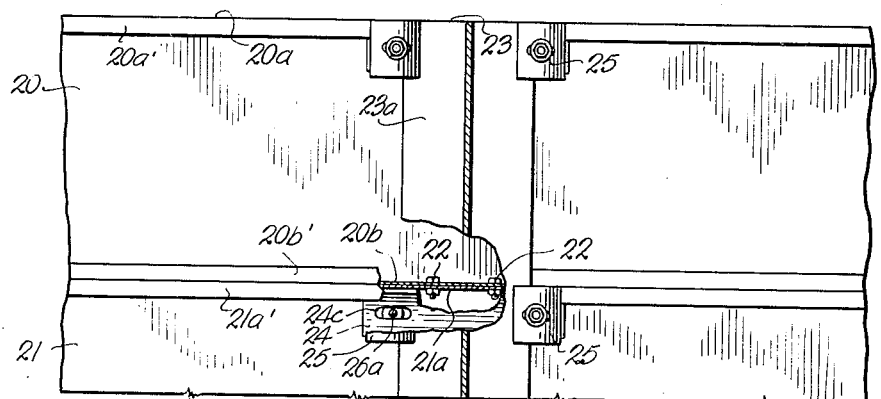
FIG. 1 is a fragmentary rear view of a sign assembly comprising vertical flanged posts and horizontal panel members, the rear flange of the post removed and portions of the web and front flange thereof partially cut away to better illustrate he consrucion tof the panels, their engagement with one another and the method of engagement of the connecting means between the panels and I-beam flange.

As previously mentioned, there are two forms of connecting means shown in the drawings. These will be separately described.

The simplest form of connecting means is shown in FIGS. 5–7, inclusive, and thus will be first described.

Referring then to FIGS. 5–7, inclusive, at 10 and 11 are generally designated two flanged posts (here I-beams) having rear flanges 10a and 11a, webs 10b and 11b and front flanges 10c and 11c. To be employed therewith are a plurality of elongate panels here generally designated 12–15, inclusive, each having (in the orientation shown in FIG. 5) upper rearwardly extending flanges 12a–15a, inclusive, and lower rearwardly extending flanges 12b–14b, inclusive. Each of the flanges 12a–15a, inclusive, has an inwardly oriented rearmost flange 12a'–15a', inclusive, and each of the flanges 12b–14b, inclusive, has inwardly extending rearmost flanges 12b'–14b, inclusive. Flanges 12a–15a, inclusive, and 12b–14b, inclusive, extend normal to the front panel or faces of the panels, while the primed flanges extend parallel thereto. The front faces or working faces of the panels are designated 12c–15c, inclusive.

Referring to FIG. 7, therein is shown, in exploded view, the elements of the connecting means now to be described. A rearmost arcuate segment is provided generally designated 16 and has two forward gripping edges 16a and 16b which preferably derive from the edges of a normally flat piece which is formed or curved in cross section in the manner shown to form the sectionally arcuate piece 16. A slotted opening 16c is provided centrally of member 16 with the slot extending horizontally on the arcuate surface of member 16. Slot 16c permits member 16 to accommodate a variety of flange thicknesses with an optimum fit, as well as permit lateral adjustment.

A front engaging member, normally horizontally oriented, is generally designated 17 and has upper and lower gripping edges 17a and 17b in working orientation; these edges being preferably derived from the end edges of a normally flat piece which is curved or formed in cross section to form the arcuate section piece seen. Member 17 is of greater length than the arcuate width of member 16. A circular opening 17c is formed centrally of member 17. The means for connecting members 16 and 17 comprise an elongate bolt generally designated 18 having enlarged head 18a, a portion 18b of the shaft thereof preferably nonthreaded, with free end 18c thereof threaded. Washer 19 and nut 20 are provided to encircle and threadedly engage shaft portion 18c of bolt 18.

The preferred manner of engagement of the connecting means is seen most clearly in FIG. 6 wherein a pair of members 16 and 16' (in one set of the connecting means, all of the numbers are the same as in FIG. 7, but primed), engage with one engaging edge 16b and 16a' of each the rear face of the I-beam post front flange 11c, while the other engaging edges 16a and 16b' engage one of the upper inwardly extending flanges 12a'–15a', inclusive, here designated 13a' for a specific example. The upper engaging edges 17a and 17a' of members 17 and 17' engage the inner surface of flange 13a' and pin it against the outer face of flange 11c. The lower portions of the edges 16a and 16b' engage the lower edges 17b and 17b' of the members 17 and 17' whereby to make a stable engagement as edges 16b and 16a' continuously engage, along their entire length, the inner or rear face of the flange 11c. This is best seen in FIG. 5.

The size of hole 17c is merely large enough for bolt shaft 18c and 18b to slide easily therethrough, while slot 16c is of sufficient length to permit some lateral adjustment of the members 16 or 16' to an optimum fit in the illustrated engagements with the I-beam post flange and members 17 or 17', as well as flange 13a'.

Figure 2:
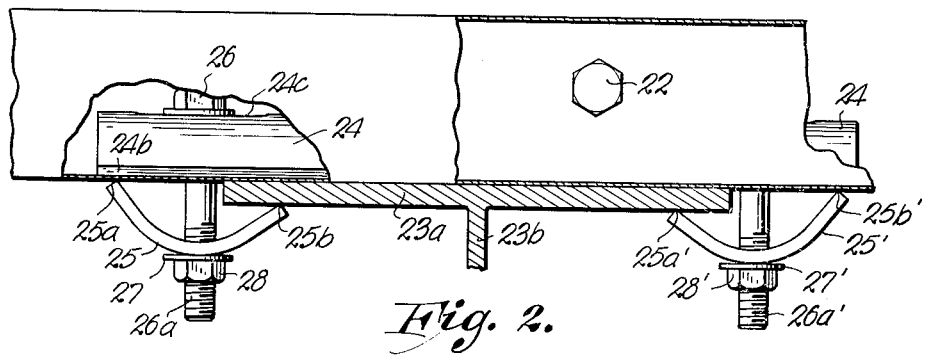
FIG. 2 is a horizontal section, looking down, of a signboard assembly comprising a flanged post (only the front flange and part of the web thereof showing), horizontally oriented flanged panels (partially cut away in several places to better illustrate the structure involved) and means connecting the panels to the front post flange, the means of FIG. 1 shown.
Figure 3:
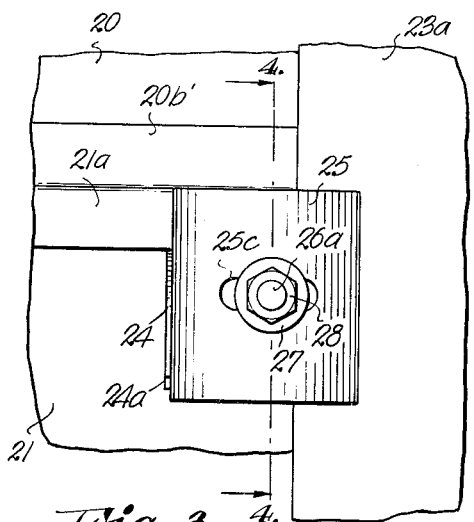
FIG. 3 is an enlarged partial or fragmentary rear elevation of a signboard assembly showing horizontally oriented panels connected to a flange of a post by the connecting means of FIGS. 1 and 2.
Figure 4:
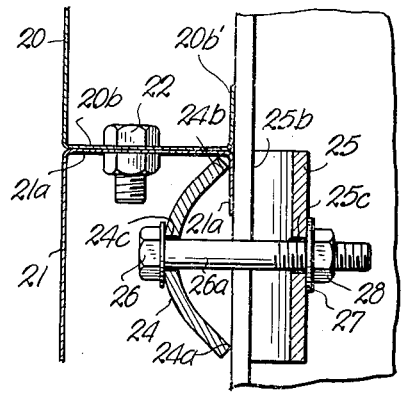
FIG. 4 is a view taken along the line 4—4 of FIG. 3 in the direction of the arrows.

In assembling the sign of FIG. 5, either a single set of connecting members may be employed engaging alternately the flanges 11c and 10c (when single sets of connecting members are used, they are alternated from one side of the flange to the other to avoid eccentricity, rather than all on one side of the flange) or, if excessive wind loads are expected, a set may be employed on each side of each of the flanges 11c and 10c, as seen in FIG. 6 on flange 11c. Whichever arrangement is employed, in the assembly of the individual sign panel sections on posts 10 and 11, the lower and upper abutting flanges of adjacent panels (in horizontal orientation) are preferably bolted to one another as best seen in the other modification (FIGS. 2 and 4). As this detail will be described with respect to that modification, it will not be repeated here. At any rate, upper panel 12 is preferably first set in place and clipped on the I-beam or other flanged post flanges 10c and 11c. The other panels are then bolted together in a group and thereafter assembled on the I-beam posts as a unit. This assembly is then bolted to the top panel, and the lower panels are clipped to the upright.

The procedure described in the preceding paragraph is recommended where assembly is at the job site. It is also possible to preassemble the sign in a shop, transporting it to the job site and mounting it as a unit.

Referring to the construction shown in FIGS. 1–4, inclusive, the prime difference in this construction from that shown in FIGS. 5–7, inclusive, lies in the provision of an elongate frontal engaging member which extends across the entire front face of the I-beam front flange and is engaged at each end thereof by an arcuate member each in the manner of arcuate members 16 and 16'. Thus, there is a single frontal engaging member with a continuous engagement along the upper panel flange with a dual engagement thereof at its ends by two rearward arcuate members. This relationship is most clearly seen in FIG. 2 in comparison with FIG. 6.

In the views of FIGS. 1–4, inclusive, there are seen only two horizontal panel members 20 and 21 having upper rearwardly extending flanges 20a and 21a, same having attached thereto inwardly extending rearwardmost flanges 20a' and 21a'. A lower rearwardly extending flange 20b may be seen in FIG. 1 with the inwardly extending rearmost flange 20b' fixed thereto. These panels are similar in configuration to panels 12c–15c, inclusive. The panels, as previously noted, are bolted together by bolts extending through corresponding openings (not seen) in flanges 20b and 21a, as seen at 22. The I-beam post shown has a front flange 23a to which the panels are connected and a web 23b, the post itself generally designated 23.

The means connecting the I-beam post and the panels comprise, first, an elongate arcuate member generally designated 24 having engaging edges 24a and 24b, the latter preferably derived from the arcuate forming of a normally rectangular flat piece. Member 24 is necessarily greater in length than the width of front flange 23a of I-beam 23 whereby to span same and extend at least a limited distance on each side thereof as seen in FIG. 2. Members 24 extend horizontally and have horizontally slotted openings 24c and 24c' (not seen) therein to receive the bolt engagement to be described. The purpose of the slots in members 24 and 25 is to accommodate a variety of flange widths.

The rearmost engaging members designated generally 25 and 25' extend vertically and engage with one edge thereof the rear face of I-beam front flange 23a and with the other edge thereof the panel upper flanges and the lower engaging edge 24a of member 24. Members 25 and 25' are arcuate in cross section whereby to provide engaging edges 25a and 25a' and 25b and 25b'. Horizontally slotted openings 25c and 25c' are provided centrally thereof whereby to receive a shaft 26a of a bolt 26, the threaded free end of which is engaged by washer 27 and nut 28 in the case of the bolt seen engaging members 24 and 25. Washers are preferably employed wherever there are slots. This would be at both bolt head and nut on double sets, and at nut only on single sets.

The engagement of the members comprise an engagement by edge 24b of member 24 of flange 21a' along its entire length forcing same against the outer face of the I-beam flange 23a, with lower edge 24a thereof continuously engaging the front surface of I-beam flange 23a along the entire width thereof. Edge 24a is also engaged by engaging edges 25a and 25b' of members 25 and 25'. Edges 25b and 25a' of members 25 and 25' engage the rear face of flange 23a along their entire length, with the upper portion of edges 25a and 25b' engaging flange 21a and pinning same against edge 24b, the lower portion thereof engaging edge 24a of member 24.

In operation, the assembly of the panels may be accomplished as in FIG. 5, with upper panel 20 first engaged in place at its upper edge by the engaging means on the front flange of the I-beam post, the lower panels (21 et seq.) then bolted together and thence bolted to the lower flange of the upper panel. Same are engaged to the front flange by other engaging means later. However, there is one difference between the two forms in that both rear members of the engaging assembly of FIGS. 1–4 must be employed, rather than there being the option of a single side edge engagement of the I-beam front flange as is present in the modification of FIGS. 5–7, inclusive.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. An engaging assembly comprising a first member arcuate in cross section along one dimension thereof, a second member arcuate in cross section along one dimension thereof, each member of such length along its said dimension as to span the width of the other member, said members comprising each a flat, substantially rectangular piece also rectangular in transverse and longitudinal section, said piece formed into arcuate section along one dimension thereof whereby to provide engaging edges thereon and means removably coupling the members together whereby they engage one another and an object therebetween in an orientation thereof at right angles to one another along said dimensions.

2. An assembly as in claim 1 wherein each member has a line edge on the engaging edges thereof.

3. An assembly as in claim 1 wherein said members are of equal length and also equal width.

4. An engaging assembly comprising a substantially rectangular first member arcuate in cross section along one dimension thereof, substantially rectangular second and third members each arcuate in cross section along one dimension thereof, each of the second and third members of such length along its said dimension as to span the width of the said first member, said first member of such length along its said dimension as to exceed the width, combined, of the second and third members, said members comprising each a flat, substantially rectangular piece also rectangular in transverse longitudinal section, said piece formed into arcuate section along one dimension thereof whereby to provide engaging edges thereon, and means removably coupling the second and third members to the first member, spaced therealong, whereby they engage said first member and any object therebetween in an orientation thereof at right angles to said first member along said dimensions.

5. An assembly as in claim 4 wherein each member has a line edge on the engaging edges thereof.

6. An assembly as in claim 4 wherein said second and third members are of equal length and width.

References Cited by the Examiner

UNITED STATES PATENTS

| | | | |
|---|---|---|---|
| 327,717 | 10/85 | Phillips | 256—69 |
| 497,679 | 5/93 | Newbury. | |
| 515,836 | 3/94 | Mueller. | |
| 1,789,849 | 1/31 | Speck | 189—35 X |
| 1,797,214 | 3/31 | Mayer et al. | |
| 2,130,546 | 9/38 | Hovey | 189—35 |
| 2,720,290 | 10/55 | Henrickson | 189—35 X |
| 2,930,665 | 3/60 | Budai | 189—35 X |

DONLEY J. STOCKING, *Primary Examiner.*